US010556561B2

(12) United States Patent
Ikeno

(10) Patent No.: US 10,556,561 B2
(45) Date of Patent: Feb. 11, 2020

(54) VEHICLE FRONT PORTION STRUCTURE

(71) Applicant: TOYOTA JIDOSHA KABUSHIKI KAISHA, Toyota-shi (JP)

(72) Inventor: Eisuke Ikeno, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/940,064

(22) Filed: Mar. 29, 2018

(65) Prior Publication Data

US 2018/0290612 A1 Oct. 11, 2018

(30) Foreign Application Priority Data

Apr. 6, 2017 (JP) ................................ 2017-076190

(51) Int. Cl.
*B60R 21/00* (2006.01)
*B60R 19/02* (2006.01)
(Continued)

(52) U.S. Cl.
CPC ............ *B60R 21/00* (2013.01); *B60R 19/023* (2013.01); *B60R 19/483* (2013.01); *B60R 21/34* (2013.01);
(Continued)

(58) Field of Classification Search
CPC ....... B60R 21/00; B60R 21/34; B60R 19/483; B60R 19/023; B60R 2021/0051; B60R 2021/343; B60R 2019/525; H01Q 1/3283; H01Q 1/3233; G01S 13/931; G01S 2013/9375; G01S 2007/027
(Continued)

(56) References Cited

U.S. PATENT DOCUMENTS 6,729,429 B2 * 5/2004 Takahashi ............ B60R 19/483
180/271
7,537,254 B2 * 5/2009 Furuya ................... G01D 11/30
293/117
(Continued)

FOREIGN PATENT DOCUMENTS

DE   10 2005 037 151 A1   2/2007
EP        2 610 114 A1   7/2013
(Continued)

*Primary Examiner* — Jason S Morrow
*Assistant Examiner* — E Turner Hicks
(74) *Attorney, Agent, or Firm* — Oblon, McClelland, Maier & Neustadt, L.L.P.

(57) ABSTRACT

A vehicle front portion structure includes a cover; an absorber provided rearward of the cover of a vehicle, the absorber being configured to absorb energy of a collision between the cover and a collision body while allowing the cover to move rearward; a front grill provided rearward of the cover and above the absorber, the front grill being configured to move rearward along with the cover during the collision between the cover and the collision body; a radar device attached to the front grill; and a deformation limiting member provided outside a radio wave irradiation range of the radar device and in a space between the radar device and the front grill or the cover, the deformation limiting member being configured to limit deformation of the front grill or the cover to the radar device side during the collision between the cover and the collision body.

8 Claims, 5 Drawing Sheets

(51) Int. Cl.
    *B60R 19/48*     (2006.01)
    *B60R 21/34*     (2011.01)
    *H01Q 1/32*     (2006.01)
    *G01S 13/931*     (2020.01)
    *B60R 19/52*     (2006.01)
    *G01S 7/02*     (2006.01)
    *G01S 13/93*     (2020.01)

(52) U.S. Cl.
    CPC ......... *G01S 13/931* (2013.01); *H01Q 1/3233* (2013.01); *H01Q 1/3283* (2013.01); *B60R 2019/525* (2013.01); *B60R 2021/0051* (2013.01); *B60R 2021/343* (2013.01); *G01S 2007/027* (2013.01); *G01S 2013/9375* (2013.01)

(58) Field of Classification Search
    USPC ............ 293/117; 296/187.09, 193.1, 193.09
    See application file for complete search history.

(56) References Cited

U.S. PATENT DOCUMENTS

| | | | |
|---|---|---|---|
| 7,753,419 B2* | 7/2010 | Kondo | B60R 19/483 |
| | | | 180/274 |
| 8,833,815 B2* | 9/2014 | Aleem | B60R 19/483 |
| | | | 293/102 |
| 2012/0200121 A1 | 8/2012 | Wuerfel | |
| 2014/0070982 A1 | 3/2014 | Inada et al. | |
| 2015/0217710 A1* | 8/2015 | Kemnitz | B60R 19/483 |
| | | | 293/117 |
| 2016/0137230 A1* | 5/2016 | Taneda | B62D 25/085 |
| | | | 296/193.09 |

FOREIGN PATENT DOCUMENTS

| | | |
|---|---|---|
| JP | 2006-347392 | 12/2006 |
| JP | 2007-1546 | 1/2007 |
| JP | 2007-15659 | 1/2007 |
| JP | 2013-14293 | 1/2013 |
| JP | 2015-140029 | 8/2015 |

* cited by examiner

VEHICLE FRONT PORTION STRUCTURE

INCORPORATION BY REFERENCE

The disclosure of Japanese Patent Application No. 2017-076190 filed on Apr. 6, 2017 including the specification, drawings and abstract is incorporated herein by reference in its entirety.

BACKGROUND

1. Technical Field

The specification discloses a vehicle front portion structure provided with a bumper cover, a bumper absorber and a front grill provided rearward of the bumper cover of a vehicle, and a radar device attached to the front grill.

2. Description of Related Art

Multiple techniques have been proposed in the related art for further reducing the damage that is done to a collision body (such as a pedestrian's leg) when the collision body collides with the front of a vehicle. Normally, the collision body has a lower portion and an upper portion interconnected upward and downward via a joint portion. A reduction in the amount of change in the flexion change angle of the joint portion of the collision body (angle formed by the lower portion and the upper portion) as well as a reduction in the collision load amount input to the collision body matters for the damage to the collision body to be further reduced.

Japanese Unexamined Patent Application Publication No. 2007-1546 (JP 2007-1546 A) discloses a technique for further reducing a load input amount to a pedestrian's knee. Specifically, JP 2007-1546 A discloses a front surface portion structure of a vehicle that is provided with a bumper cover provided at the front end of the vehicle, a front bumper reinforcement provided rearward of the bumper cover of the vehicle to be separated by a predetermined distance, a radiator grill provided above the bumper cover, a retainer provided rearward of the radiator grill of the vehicle, and a bumper absorber provided rearward of the bumper cover of the vehicle. In JP 2007-1546 A, both the retainer and the bumper absorber are closer to the front side of the vehicle than the front bumper reinforcement. Accordingly, collision energy is absorbed by the radiator grill, the retainer, and the bumper absorber before the pedestrian's knee receives a collision reaction force from the front bumper reinforcement during a frontal collision. As a result, the load input amount to the pedestrian's knee attributable to the front bumper reinforcement can be further reduced during the frontal collision.

SUMMARY

Also proposed is a radar device for detecting the state of the space in front of a vehicle being attached to the front grill of the vehicle. The radar device emits radio waves such as millimeter waves and detects the presence or absence of an object, the speed of an object, and so on based on the reflected waves of the emitted radio waves. Normally, the radar device described above is a rigid body, is unlikely to be crushed, and is not capable of absorbing collision energy. Accordingly, a retreat space is provided around the radar device (mainly in the rearward direction and rearward and downward direction) so that the radar device is retreated in a collision load receiving direction without generating a collision reaction force. Basically, the collision load receiving direction is the same as the direction of a collision load. In the case of a frontal collision, the collision load receiving direction is mainly the vehicle rearward direction or the vehicle rearward and downward direction. By the retreat space being provided in the collision load receiving direction, the radar device is capable of performing a retreat movement along with the front grill and so on when a collision body collides with the front of the vehicle. As a result, the collision body receives no collision reaction force from the radar device and most of the collision load is absorbed by a bumper absorber provided below the radar device. As a result, the collision load amount input to the collision body can be further reduced.

Although the attachment portion of the radar device (such as both end portions of the radar device in a width direction) is in contact with the front grill, the upper end surface and the front end surface of the radar device are normally apart from the front grill and a bumper cover. In other words, predetermined spaces are present above and in front of the radar device.

By the retreat space being provided in the collision load receiving direction as described above, the radar device performs the retreat movement in the collision load receiving direction along with the front grill and so on when the collision body collides with the front of the vehicle. Accordingly, the predetermined spaces above and in front of the radar device remain intact even after the absorption of the collision energy is completed and the retreat movement of the front grill and so on is completed. Once the upper portion of the collision body moves into the predetermined spaces, the upper portion of the collision body is additionally inclined by the distance between the predetermined spaces. As a result, the flexion change angle of the joint portion of the collision body may further increase and more damage may be done to the collision body.

In the specification, a vehicle front portion structure that is capable of further reducing damage to a collision body is provided.

An aspect of the disclosure relates to a vehicle front portion structure. The vehicle front portion structure includes a bumper cover; a bumper absorber provided rearward of the bumper cover of a vehicle, the bumper absorber being configured to absorb energy of a collision between the bumper cover and a collision body during the collision while allowing the bumper cover to move rearward; a front grill provided rearward of the bumper cover of the vehicle and above the bumper absorber, the front grill being configured to move rearward along with the bumper cover during the collision between the bumper cover and the collision body; a radar device attached to the front grill; and a deformation limiting member attached to at least one of the front grill and the radar device to be positioned outside a radio wave irradiation range of the radar device and in a space between the radar device and the front grill or the bumper cover, the deformation limiting member being configured to limit deformation of the front grill or the bumper cover to the radar device side during the collision between the bumper cover and the collision body (in the present specification, "move rearward" also means "move substantially rearward").

According to the aspect of the disclosure, the collision energy is absorbed by the bumper absorber and the bumper cover, the front grill, and the radar device move rearward, and thus a collision reaction force is unlikely to be generated and a collision load amount input to the collision body can be further reduced. In addition, by the deformation limiting member being provided, the deformation of the front grill or the bumper cover to the radar device side is limited even when the collision body falls to the front grill or the bumper cover after the collision energy is consumed (after a retreat movement is completed), and thus the inclination amount of an upper portion of the collision body falling to the front grill and so on can be further reduced and the flexion change angle of a joint portion of the collision body can be further reduced. As a result, damage to the collision body can be further reduced.

In the vehicle front portion structure according to the aspect of the disclosure, the deformation limiting member may be provided with at least one of a first deformation limiting member and a second deformation limiting member, the first deformation limiting member being provided between a front facing portion of the bumper cover facing a vicinity of an upper end of the radar device in a vehicle front-rear direction and the vicinity of the upper end of the radar device and being configured to limit deformation of the front facing portion to the radar device side, and the second deformation limiting member being provided between an upper facing portion of the front grill facing an upper end surface of the radar device in a vehicle up-down direction and the upper end surface of the radar device and being configured to limit deformation of the upper facing portion to the radar device side.

According to the aspect of the disclosure, the deformation limiting member is provided at the position described above, and thus the deformation of the bumper cover or the front grill to the radar device side can be prevented without transmission and reception of radio waves by the radar device being hindered.

In the vehicle front portion structure according to the aspect of the disclosure, the deformation limiting member may be integrally molded with the front grill.

According to the aspect of the disclosure, the deformation limiting member and the front grill are integrated with each other, and thus the number of components can be further reduced. In addition, since the deformation limiting member is integrated with the front grill instead of the radar device, the radar device does not have to vary with the types of vehicles and an increase in the number of the types of radar devices can be prevented.

In the vehicle front portion structure according to the aspect of the disclosure, the deformation limiting member may be at least one rib-shaped portion integrally molded with the front grill.

According to the aspect of the disclosure, the deformation limiting member can be easily molded through a molding process for the front grill insofar as the deformation limiting member has a rib shape.

In the vehicle front portion structure according to the aspect of the disclosure, the deformation limiting member may be attached to the front grill, and a gap for adjustment of a position of the radar device may be provided between the deformation limiting member and the radar device.

According to the aspect of the disclosure, the attachment position of the radar device can be appropriately adjusted (changed) and the transmission and reception of the radio waves can be performed further appropriately.

In the vehicle front portion structure disclosed in the specification, the collision energy is absorbed by the bumper absorber. The bumper cover, the front grill, and the radar device move rearward, and thus a collision reaction force is unlikely to be generated and a collision load amount input to the collision body can be further reduced. In addition, by the deformation limiting member being provided, the deformation of the front grill or the bumper cover to the radar device side is limited even when the collision body falls to the front grill or the bumper cover after the collision energy is consumed (after a retreat movement is completed), and thus the inclination amount of an upper portion of the collision body falling to the front grill and so on can be further reduced and the flexion change angle of a joint portion of the collision body can be further reduced.

As a result, damage to the collision body can be further reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
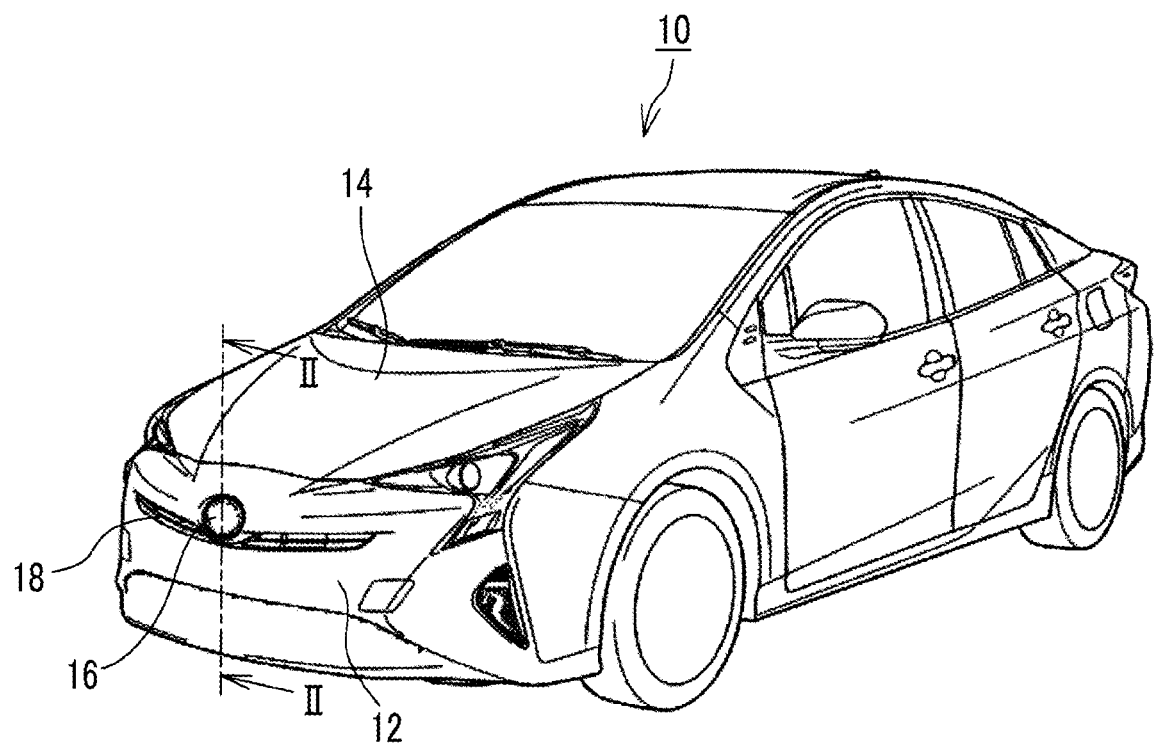
FIG. 1 is a perspective view in which a vehicle is seen from the front.
Figure 2:
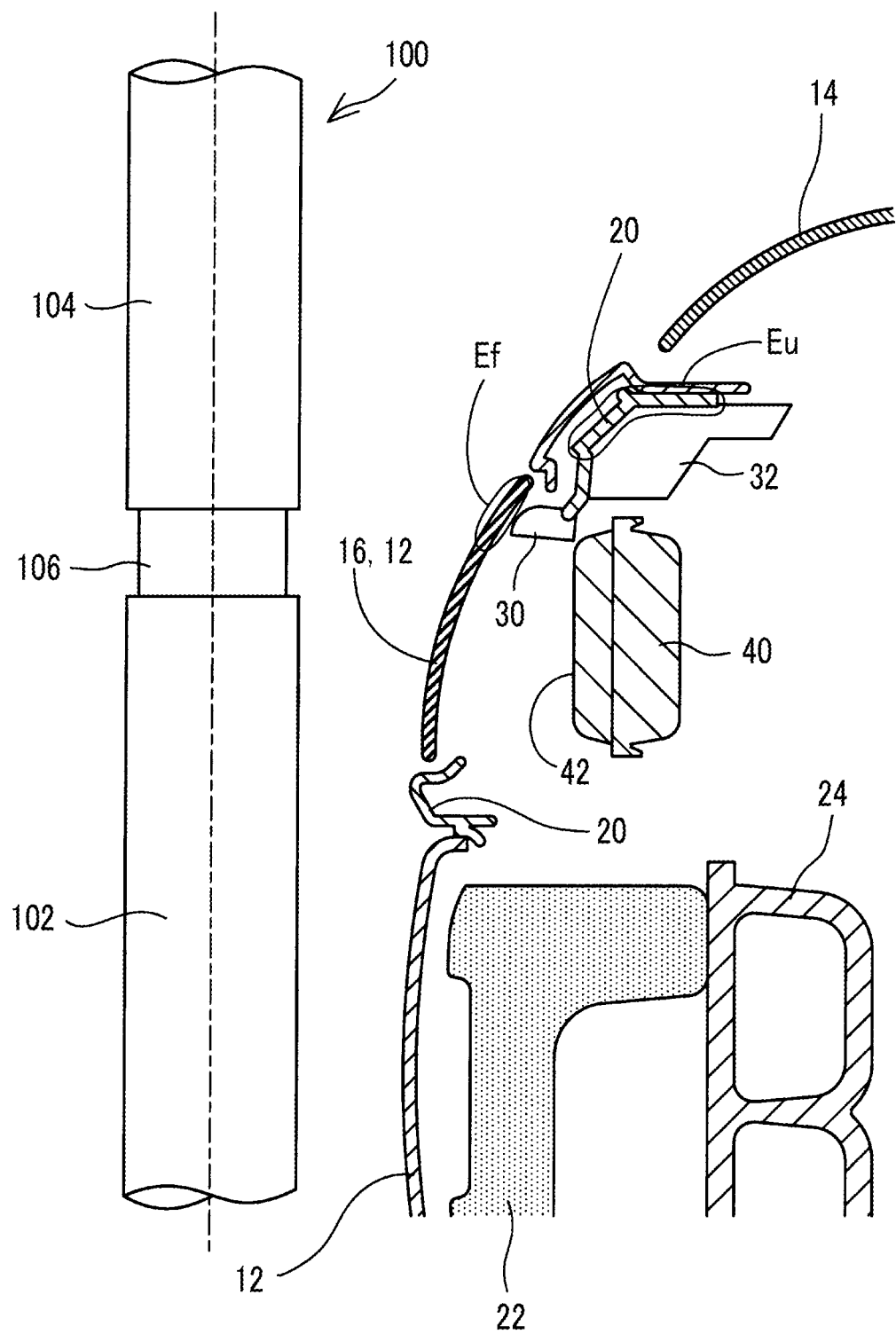
FIG. 2 is a midline sectional view of the vehicle front portion that is indicated by line II-II in FIG. 1.

Hereinafter, a vehicle front portion structure will be described with reference to accompanying drawings. FIG. 1 is a perspective view in which a vehicle 10 is seen from the front. FIG. 2 is a midline sectional view of the vehicle front portion that is indicated by line II-II in FIG. 1. The front end surface of the vehicle 10 is covered with a bumper cover 12. A hood 14 is provided on the bumper cover 12 and an engine compartment is configured below the hood 14.

The bumper cover 12 is a thin-walled molded member formed of a resin member or the like. The bumper cover 12 can be deformed relatively easily. An air introduction port 18 elongated in a width direction is formed in the bumper cover 12. In addition, an emblem 16 is provided substantially in the middle of the air introduction port 18 in the width direction. A material allowing radio waves emitted from a radar device 40 (described later) to be transmitted, such as resin, constitutes the emblem 16.

A bumper reinforcement (hereinafter, referred to as a "bumper R/F 24") and a front grill 20 are provided behind the bumper cover 12. The bumper R/F 24 extends in a vehicle width direction, and both ends of the bumper R/F 24 in the width direction are coupled with a pair of front side members (not illustrated). The bumper R/F 24 is provided at a position separated rearward by a predetermined distance from the bumper cover 12, and a bumper absorber 22 is provided between the bumper R/F 24 and the bumper cover 12.

The bumper absorber 22 is provided rearward of the bumper cover 12 of the vehicle. When a collision body 100 collides with the bumper cover 12, the bumper absorber 22 absorbs the energy of the collision by being compressively deformed in a vehicle front-rear direction while allowing the bumper cover 12 to move rearward. A foamed resin material or the like constitutes the bumper absorber 22, and the bumper absorber 22 absorbs impact energy by being deformed. The bumper absorber 22 extends in the vehicle width direction and is provided along the bumper R/F 24. The rear end portion of the bumper absorber 22 is fixed to (in contact with) the front surface of the bumper R/F 24.

Figure 3:
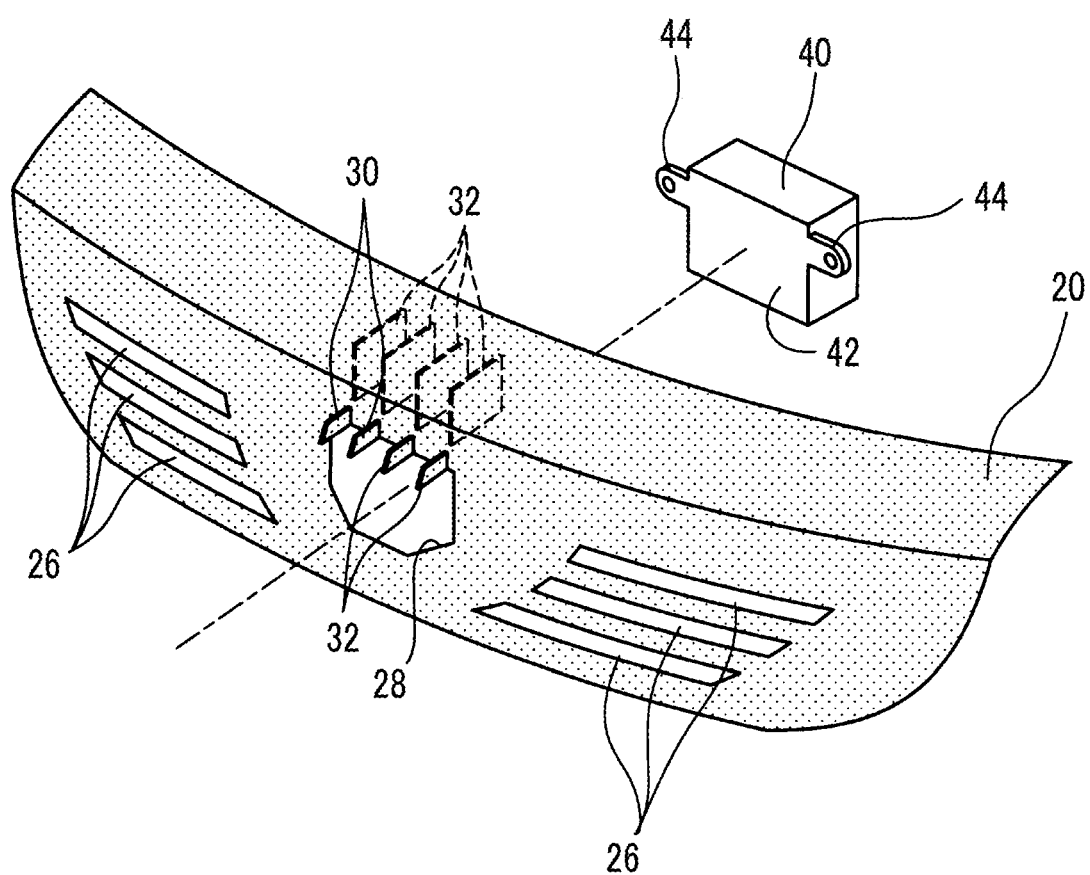
FIG. 3 is a schematic diagram of a front grill.

The front grill 20 is provided rearward of the bumper cover 12 and above the bumper absorber 22. FIG. 3 is a schematic diagram of the front grill 20. FIG. 3 is a diagram in which the front grill 20 is significantly simplified. Multiple deformation limiting members, through-holes, and uneven parts are formed in the actual front grill 20. The front grill 20 is a thin-walled molded member formed of a resin member or the like and can be deformed relatively easily as is the case with the bumper cover 12. A plurality of grill holes 26 elongated in the width direction is formed in the front grill 20. In addition, a middle hole 28 is formed substantially in the middle of the front grill 20 in the width direction. The middle hole 28 is provided at a position substantially directly facing the emblem 16. The middle hole 28 is a through-hole for passing the radio waves transmitted and received by the radar device 40.

The radar device 40 is a device emitting the radio waves such as millimeter waves and detecting the presence or absence of an obstacle, the speed of an obstacle, and so on based on the reflected waves of the radio waves. The radar device 40 is attached to the back surface of the front grill 20 such that the radio wave transmitting and receiving surface of the radar device 40, which is the front end surface of the radar device 40, directly faces the middle hole 28. The radio waves emitted from the radar device 40 pass through the middle hole 28, are transmitted through the emblem 16, and reach the outside of the vehicle. In addition, the reflected waves reflected by an object outside the vehicle reach the radar device 40 as a result of flowing opposite to the above. A fastening portion 44 fastened to the front grill 20 is provided at a peripheral edge of the radar device 40. A fastening hole is formed in the fastening portion 44, and a fastening bolt (not illustrated) screwed into the front grill 20 is inserted into the fastening hole. Normally, the fastening hole is larger in diameter than the fastening bolt. The attachment position of the radar device 40 can be adjusted by the difference between the diameter of the fastening hole and the diameter of the fastening bolt.

Although the radar device 40 is in contact with the front grill 20 in an attachment portion 42, the radar device 40 is apart from the front grill 20 and the bumper cover 12 (including the emblem 16) in places other than the attachment portion 42. As a result, slight spaces are formed above and in front of the radar device 40. In the vehicle front portion structure disclosed in the specification, deformation limiting members limiting deformation of the front grill 20 or the bumper cover 12 to the radar device 40 side are provided in the spaces and outside the radio wave irradiation range of the radar device 40.

Although various configurations are conceivable with regard to the deformation limiting members, a first deformation limiting member 30 and a second deformation limiting member 32 integrally molded with the front grill 20 are used as the deformation limiting members in the illustrated example. The first deformation limiting member 30 is a rib extending from the upper end edge of the middle hole 28 toward the front of the vehicle (bumper cover 12 side). In a case where the part of the bumper cover 12 (including the emblem 16) that faces the vicinity of the upper end of the radar device 40 in the vehicle front-rear direction is referred to as a "front facing region Ef", the first deformation limiting member 30 is provided between the front facing region Ef and the vicinity of the upper end of the radar device 40. More specifically, the first deformation limiting member 30 is provided at a position overlapping the radar device 40 in an up-down direction and not overlapping the radar device 40 in the front-rear direction. The lower end of the first deformation limiting member 30 is positioned above the upper end of the radio wave irradiation range of the radar device 40. A slight gap is provided between the rear end of the first deformation limiting member 30 and the front end of the radar device 40. The gap is optional though. Normally, however, the position of the radar device 40 needs to be adjusted for each vehicle so that the radio waves are appropriately emitted. Although not particularly limited, it is desirable that a radar device positioning gap is provided between the rear end of the first deformation limiting member 30 and the front end of the radar device 40 so that positioning of the radar device 40 is facilitated. A slight gap is provided between the front end of the first deformation limiting member 30 and the front facing region Ef (bumper cover 12) as well. Although the gap is also optional, it is desirable that a slight gap is provided in the above-described place as well in view of component assembly workability.

The second deformation limiting member 32 is a rib extending downward (to the radar device 40 side) from the upper end surface of the front grill 20. In a case where the part of the front grill 20 (not including the first deformation limiting member 30 and the second deformation limiting member 32) that faces the upper end surface of the radar device 40 in the vehicle up-down direction is referred to as an "upper facing region Eu", the second deformation limiting member 32 is provided between the upper facing region Eu and the upper end surface of the radar device 40. More specifically, the second deformation limiting member 32 is provided at a position overlapping the radar device 40 in the front-rear direction and not overlapping the radar device 40 in the up-down direction. The upper end of the second deformation limiting member 32 is attached to the upper end surface of the front grill 20. A slight gap is provided between the lower end of the second deformation limiting member 32 and the upper end surface of the radar device 40. Although the gap is optional, the position of the radar device 40 needs to be adjusted as described above, and thus it is desirable that a radar device positioning gap is provided between the lower end of the second deformation limiting member 32 and the upper end surface of the radar device 40.

A reason why the first deformation limiting member 30 and the second deformation limiting member 32 are provided will be described below. The collision body 100 handled in the specification will be described first. The collision body 100 is, for example, a pedestrian's leg or a leg impactor imitating a pedestrian's leg. As illustrated in FIG. 2, the collision body 100 has a lower portion 102 corresponding to a pedestrian's knee and below (shin), an upper portion 104 corresponding to a pedestrian's knee and above (thigh), and a joint portion 106 connecting the lower portion 102 and the upper portion 104 to each other. For an effective reduction in the degree of damage done to the collision body 100, which is a so-called fault value, during the collision between the collision body 100 and the vehicle front portion, the collision load amount that is input to the collision body 100 needs to be further reduced and a flexion change angle $\theta$ of the joint portion 106 (the amount of change in the angle that is formed by the lower portion 102 and the upper portion 104, refer to FIG. 4) needs to be further reduced. The flexion change angle $\theta$ means the amount of change in flexion angle from the state that is illustrated in FIG. 2, that is, a state where the center line of the lower portion 102 and the center line of the upper portion 104 are aligned in a straight line.

In the vehicle front portion structure disclosed in the specification, the bumper cover 12 and the front grill 20 are movable in a load receiving direction and the bumper absorber 22 absorbing the collision energy is provided rearward of the bumper cover 12 so that the collision load amount input to the collision body 100 during the frontal collision is further reduced. The "load receiving direction" is a movement direction in which no collision reaction force is generated. Basically, the load receiving direction is the same as the direction of a load. In the case of the frontal collision, the load receiving direction is mainly the vehicle rearward direction or the vehicle rearward and downward direction. As a result of the configuration described above, a collision reaction force is unlikely to be generated in the bumper cover 12 and so on and the collision energy is consumed by the bumper absorber 22 being deformed during the frontal collision. The collision energy can be consumed while the amount of the load received by the collision body 100 is reduced as described above.

The radar device 40 is attached to the back surface of the front grill 20 as described above. The radar device 40 is a rigid body that has a relatively high strength. The radar device 40 is unlikely to be deformed and is unlikely to absorb the collision energy. Once the radar device 40 collides with the collision body 100 that is yet to consume the collision energy, a collision reaction force is generated and the collision load amount input to the collision body 100 further increases. Accordingly, the radar device 40 moves in the load receiving direction along with the front grill 20 such that the radar device 40 does not collide with the collision body 100 that is yet to consume the collision energy. A space for allowing the movement of the radar device 40, that is, a retreat space is provided on the load receiving direction (mainly vehicle rearward direction and vehicle rearward and downward direction) side of the radar device 40. The radar device 40 is capable of moving in the load receiving direction along with the front grill 20 during the collision by the retreat space being provided.

As a matter of course, in a case where the retreat space is provided in the direction in which the collision load is received and the radar device 40 is subjected to a retreat movement along with the front grill, the position of the radar device 40 with respect to the bumper cover 12 and the front grill 20 remains almost unchanged compared to a point in time preceding the collision at the point in time when the retreat movement of the bumper cover 12 and so on is over (point in time when the collision energy is completely consumed). As described above, certain spaces are present between the front end surface of the radar device 40 and the bumper cover 12 (emblem 16) and between the upper end surface of the radar device 40 and the front grill 20 in the stage preceding the collision. In the following description, the space between the front end surface of the radar device 40 and the bumper cover 12 (emblem 16) will be referred to as a "front space" and the space between the upper end surface of the radar device 40 and the front grill 20 will be referred to as an "upper space". The front space and the upper space described above remain intact even at the point in time when the retreat movement is terminated and the collision energy is completely consumed.

When the retreat movement of the bumper cover 12 and so on is over and the collision energy is completely consumed, the collision body 100 collapses to the vehicle side and the upper portion 104 of the collision body 100 falls onto the bumper cover 12 or the front grill 20 in relatively many cases. The bumper cover 12 and the front grill 20 are easily deformed even by a relatively small force. Accordingly, in a case where the first deformation limiting member 30 and the second deformation limiting member 32 are not present, the bumper cover 12 and the front grill 20 are deformed to the radar device 40 side, such that the upper space or the front space is crushed by the weight of the upper portion 104, once the upper portion 104 of the collision body 100 falls down. In this case, the upper portion 104 of the collision body 100 is additionally inclined by the size of the front space or the upper space. As a result, the amount of change in the angle that is formed by the upper portion 104 and the lower portion 102, that is, the flexion change angle θ of the joint portion 106 becomes larger.

Figure 4:
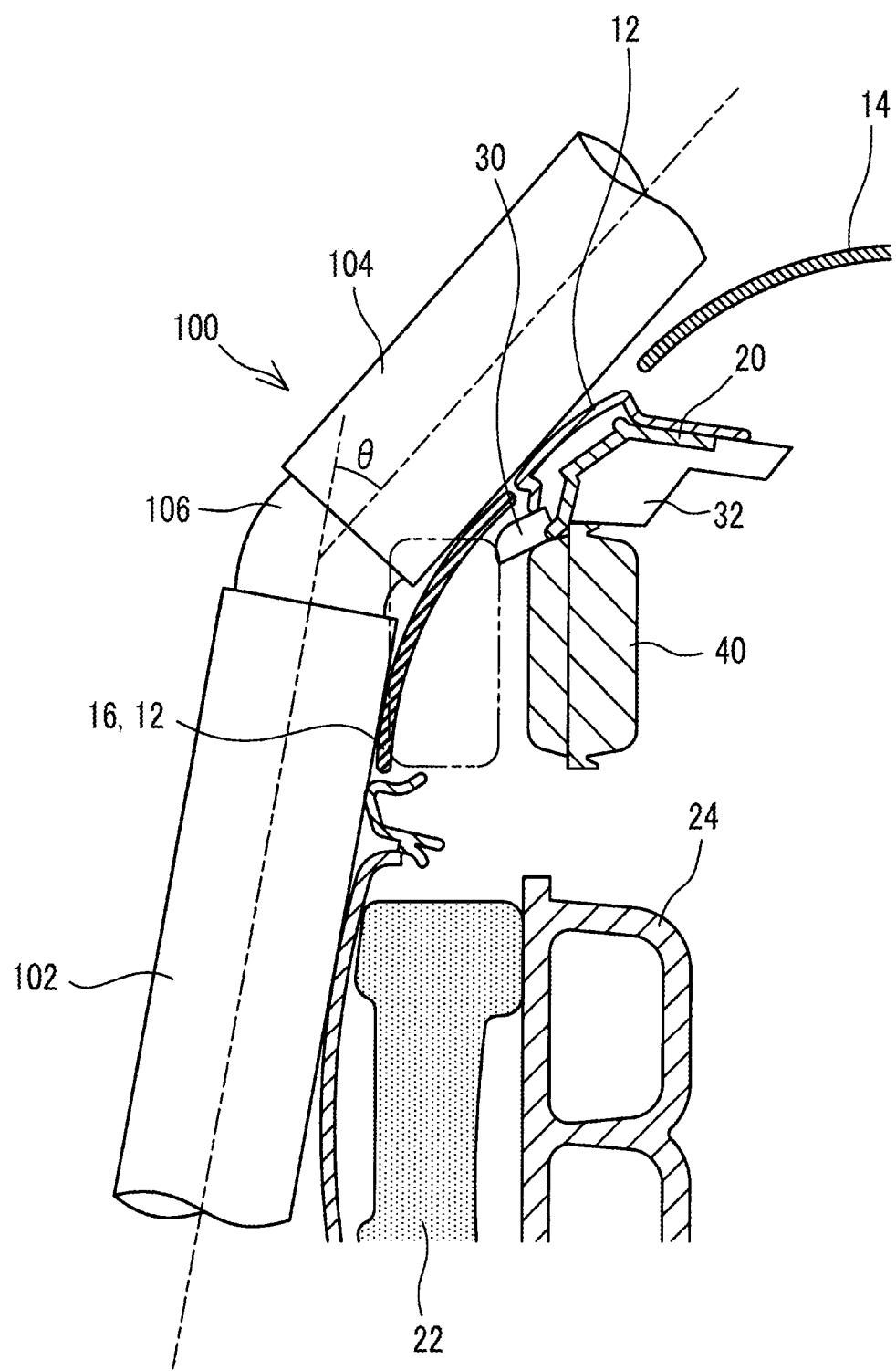
FIG. 4 is a sectional view of the vehicle front portion at a point in time when collision energy is consumed.

In the front portion structure disclosed in the specification, the first and second deformation limiting members 30, 32 are provided in the upper space and the front space so that the deformation of the bumper cover 12 or the front grill 20 to the radar device 40 side is further reliably suppressed. As a result, deformation of the bumper cover 12 and the front grill 20 to the radar device 40 side can be further reduced and, eventually, the collapse amount of the upper portion 104 of the collision body 100 can be further reduced. This will be described with reference to FIG. 4. FIG. 4 is a sectional view of the vehicle front portion at a point in time when the collision energy is absorbed by the bumper absorber 22.

As illustrated in FIG. 4, the collision energy at the time of the frontal collision is absorbed by the bumper absorber 22 being compressively deformed. In addition, the bumper cover 12 and the front grill 20 move in the load receiving direction (vehicle rearward direction in the illustrated example), such that no collision reaction force is generated, as described above and as illustrated in FIG. 4. At the time described above, the radar device 40 moves in the load receiving direction along with the front grill 20. The rectangle surrounded by two-dot chain line that is illustrated in FIG. 4 shows the pre-collision position of the radar device 40.

Normally, the collision body 100 falls toward the vehicle side at the point in time when the retreat movement is completed, that is, at the point in time when the collision energy is completely absorbed in many cases. At the time described above, the lower portion 102 of the collision body 100 is supported by the lower portion of the bumper cover 12 and the bumper absorber 22 as illustrated in FIG. 4. The upper portion 104 of the collision body 100, in the meantime, is supported by the upper portion of the bumper cover 12 and the front grill 20. Accordingly, in a case where the bumper cover 12 or the front grill 20 is significantly deformed to the radar device 40 side, the inclination amount of the upper portion 104 of the collision body 100 also increases and the flexion change angle θ of the joint portion 106 increases.

In the front portion structure disclosed in the specification, the first deformation limiting member 30 is provided between the front end surface of the radar device 40 and the bumper cover 12 and the second deformation limiting member 32 is provided between the upper end surface of the radar device 40 and the front grill 20 as illustrated in FIGS. 2 and 4. Accordingly, the first deformation limiting member 30 and the second deformation limiting member 32 function as props and further reliably suppress deformation of the bumper cover 12 and the front grill 20 to the radar device 40 side. As a result, inclination of the upper portion 104 of the collision body 100 is limited and the flexion change angle θ of the joint portion 106 is further reduced.

When the upper portion 104 of the collision body 100 falls to the bumper cover 12 and so on, the collision energy is almost consumed by the bumper absorber 22 being deformed. Accordingly, even when the upper portion 104 of the collision body 100 hits the radar device 40 via the front grill 20, the second deformation limiting member 32, and so on, the force that is received by the radar device 40 is sufficiently small (magnitude corresponding to the weight of the upper portion 104 of the collision body 100) and the reaction force that the collision body 100 receives from the radar device 40 is sufficiently small as well. Therefore, the collision load amount input to the collision body 100 remains almost unchanged despite the providing of the first deformation limiting member 30 and the second deformation limiting member 32. The flexion change angle θ of the joint portion 106, in the meantime, is further reduced as described above, and thus the degree of damage to the collision body 100, that is, the fault value can be effectively reduced.

The configuration described above is an example, and configurations other than the configuration described above may be appropriately modified insofar as a deformation limiting member limiting the deformation of the front grill 20 or the bumper cover 12 to the radar device 40 side is provided outside the radio wave irradiation range of the radar device 40 and in the space between the radar device 40 and the front grill 20 or the bumper cover 12. For example, although the first deformation limiting member 30 and the second deformation limiting member 32 are provided in two places in the above description, one being between the front facing region Ef and the vicinity of the upper end of the radar device 40 and the other one being between the upper facing region Eu and the upper end surface of the radar device 40, the deformation limiting member may also be provided in another place insofar as the place is outside the radio wave irradiation range of the radar device 40 and in the space between the radar device 40 and the front grill 20 or the bumper cover 12. For example, the deformation limiting member may be provided between the part of the bumper cover 12 that faces the vicinity of the lower end of the radar device 40 in the vehicle front-rear direction and the vicinity of the lower end of the radar device 40.

Either the first deformation limiting member 30 or the second deformation limiting member 32 may be provided alone as well although both the first deformation limiting member 30 and the second deformation limiting member 32 are provided in the above description. Still, the collapse position of the upper portion 104 of the collision body 100 varies with the shape of the vehicle front portion, the shape of the collision body 100, the position of the collision, and so on, and thus desirable is, for example, the providing of both the first deformation limiting member 30 and the second deformation limiting member 32 for the deformation of the front grill 20 and the bumper cover 12 to be further reliably suppressed regardless of the collapse position of the upper portion 104 of the collision body 100.

Figure 5:
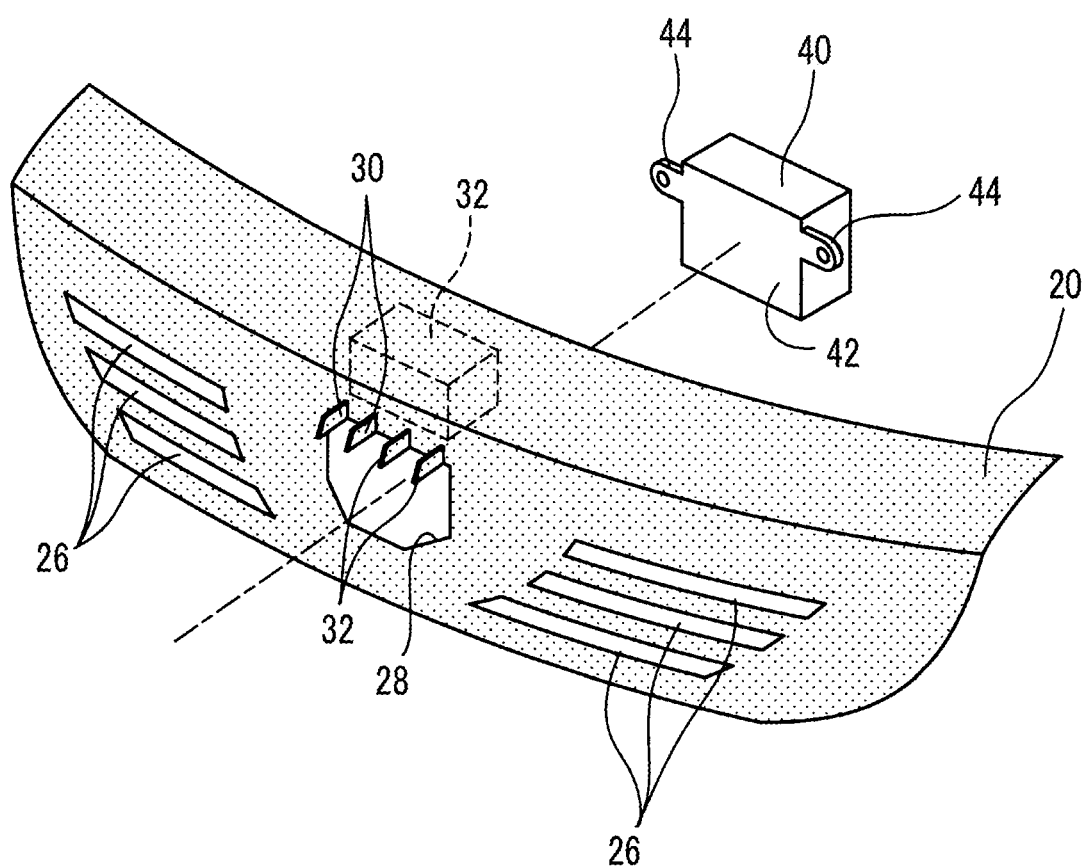
FIG. 5 is a diagram illustrating an example of another deformation limiting member.

In the above description, the first deformation limiting member 30 and the second deformation limiting member 32 are ribs integrally molded with the front grill 20. When the first deformation limiting member 30 and the second deformation limiting member 32 are ribs as described above, the first deformation limiting member 30 and the second deformation limiting member 32 can be easily molded through a molding process for the front grill 20 (such as an injection molding process). Still, the first deformation limiting member 30 and the second deformation limiting member 32 are not limited to ribs and may have another shape. For example, the second deformation limiting member 32 may have a substantially block shape elongated in the vehicle width direction as illustrated in FIG. 5. Nonetheless, as is apparent from the above description, the first deformation limiting member 30 and the second deformation limiting member 32 are members further reliably suppressing the deformation of the front grill 20 and the bumper cover 12 by functioning as props. Accordingly, it is desirable that the first deformation limiting member 30 and the second deformation limiting member 32 are hardly deformed in terms of shape and material.

The first deformation limiting member 30 and the second deformation limiting member 32 do not necessarily have to be integrally molded with the front grill 20 and may be components separate from the front grill 20. Still, for a reduction in the number of components, it is desirable that the first deformation limiting member 30 and the second deformation limiting member 32 are, for example, integrally molded with the front grill 20. In addition, the first deformation limiting member 30 and the second deformation limiting member 32 may be integrated with the radar device 40 instead of the front grill 20. Still, for a reduction in the number of components, it is desirable that the first deformation limiting member 30 and the second deformation limiting member 32 are, for example, integrated with the front grill 20 instead of the radar device 40. In other words, the shapes of the front grill 20 and the bumper cover 12 vary with the types of vehicles and the shapes of the first deformation limiting member 30 and the second deformation limiting member 32 vary with the types of vehicles as well. The radar device 40, meanwhile, is not limited by the types of vehicles and maintains almost the same shape, and thus the radar device 40 of the same type is used in a plurality of types of vehicles. In a case where the radar device 40 is integrated with the first deformation limiting member 30 and the second deformation limiting member 32 that have the shapes varying with the types of vehicles, the shape of the radar device 40 (including the first deformation limiting member 30 and the second deformation limiting member 32) varies with the types of vehicles, and thus an increase in the number of component types ensues. In a case where the first deformation limiting member 30 and the second deformation limiting member 32 are integrated with the front grill 20 with the component type of the front grill 20 previously prepared for each type of vehicle, in contrast, the number of components can be further reduced and an increase in the number of component types can be effectively prevented at the same time.

In the above description, gaps are provided between the first deformation limiting member 30 and the radar device 40 and between the second deformation limiting member 32 and the radar device 40. The gaps are optional though. Still, the attachment position of the radar device 40 needs to be adjusted for radio wave emission to a desired range as described above. In other words, the position of the radar device 40 varies within a certain range from vehicle to vehicle. Although not particularly limited, it is desirable that the gaps for the adjustment of the position of the radar device 40 are provided between the first deformation limiting member 30 and the radar device 40 and between the second deformation limiting member 32 and the radar device 40 so that the variation of the attachment position is allowed.

Although not particularly limited, it is desirable that the gaps between the first deformation limiting member 30 and the radar device 40 and between the second deformation limiting member 32 and the radar device 40 are as small as possible for the amounts of the deformation of the front grill 20 and the bumper cover 12 to the radar device 40 side to be further reduced. Accordingly, it is desirable that the distance from the radar device 40 to the first deformation limiting member 30 and the second deformation limiting member 32 is equal to or less than, for example, the value Dm+Da that is obtained by a slight margin Da being added to a movable range distance Dm of the radar device 40. Although not particularly limited, the margin Da can be, for example, 50% to 100% of the movable range distance Dm of the radar device (0.5×Dm≤Da≤1×Dm). In this case, the distances of the gaps between the first deformation limiting member 30 and the radar device 40 and between the second deformation limiting member 32 and the radar device 40 are equal to or less than 150% to 200% of the movable range distance Dm of the radar device 40.

The movable range of the radar device 40 means the range in which the attachment position of the radar device 40 is capable of changing. Conceivable is a case where, for example, the radar device 40 has a fastening hole and the radar device 40 is attached by a bolt inserted into the fastening hole being screwed into the front grill 20. In a case where the fastening hole is larger in diameter than the bolt at the time described above, the attachment position of the radar device 40 can be changed by the difference between the diameters of the fastening hole and the bolt. Accordingly, in this case, the movable range distance Dm of the radar device is the value that is obtained by the diameter of the bolt being subtracted from the diameter of the fastening hole.

What is claimed is:

1. A vehicle front portion structure comprising:
   a bumper cover;
   a bumper absorber provided rearward of the bumper cover of a vehicle, the bumper absorber being configured to absorb energy of a collision between the bumper cover and a collision body during the collision while allowing the bumper cover to move rearward;
   a front grill provided rearward of the bumper cover of the vehicle and above the bumper absorber, the front grill being configured to move rearward along with the bumper cover during the collision between the bumper cover and the collision body;
   a radar device attached to the front grill; and
   a deformation limiting member attached to at least one of the front grill and the radar device to be positioned outside a radio wave irradiation range of the radar device and in a space between the radar device and the front grill or the bumper cover, the deformation limiting member being configured to limit deformation of the front grill or the bumper cover to a radar device side during the collision between the bumper cover and the collision body.

2. The vehicle front portion structure according to claim 1, wherein the deformation limiting member is provided with at least one of a first deformation limiting member and a second deformation limiting member, the first deformation limiting member being provided between a front facing portion of the bumper cover facing a vicinity of an upper end of the radar device in a vehicle front-rear direction and the vicinity of the upper end of the radar device and being configured to limit deformation of the front facing portion to the radar device side, and the second deformation limiting member being provided between an upper facing portion of the front grill facing an upper end surface of a radar device in a vehicle up-down direction and the upper end surface of the radar device and being configured to limit deformation of the upper facing portion to the radar device side.

3. The vehicle front portion structure according to claim 1, wherein the deformation limiting member is integrally molded with the front grill.

4. The vehicle front portion structure according to claim 3, wherein the deformation limiting member is at least one rib-shaped portion integrally molded with the front grill.

5. The vehicle front portion structure according to claim 1, wherein:
   the deformation limiting member is attached to the front grill; and
   a gap for adjustment of a position of the radar device is provided between the deformation limiting member and the radar device.

6. The vehicle front portion structure according to claim 1, wherein the deformation limiting member is closer to a rear side of the vehicle than the bumper cover.

7. The vehicle front portion structure according to claim 2, wherein:
   the first deformation limiting member is provided at a position overlapping the radar device in the vehicle up-down direction and not overlapping the radar device in the vehicle front-rear direction, and
   the second deformation limiting member is provided at a position overlapping the radar device in the vehicle front-rear direction and not overlapping the radar device in the vehicle up-down direction.

8. The vehicle front portion structure according to claim 7, wherein:
   the first deformation limiting member includes a rib extending from an upper end edge of a middle hole of the front grill toward a front side of the vehicle,
   the second deformation limiting member includes a rib to the radar device side from an upper end surface of the front grill.

* * * * *